Feb. 12, 1924.

J. R. MONTGOMERY

DISK WHEEL

Filed Jan. 15, 1923

1,483,740

Inventor
J. R. Montgomery
by Wilkinson & Giusta
Attorneys.

Patented Feb. 12, 1924.

1,483,740

UNITED STATES PATENT OFFICE.

JAMES R. MONTGOMERY, OF BUTTE, MONTANA, ASSIGNOR OF ONE-FOURTH TO THOMAS F. GOLDEN AND ONE-FOURTH TO WILLIAM J. McINTOSH, BOTH OF BUTTE, MONTANA.

DISK WHEEL.

Application filed January 15, 1923. Serial No. 612,782.

*To all whom it may concern:*

Be it known that I, JAMES R. MONTGOMERY, a citizen of the United States, residing at Butte, in the county of Silver Bow and State of Montana, have invented certain new and useful Improvements in Disk Wheels, of which the following is a specification.

The present invention relates to improvements in disk wheels in which a double disk construction is used, the two disks being entirely independent and having no connection whereby to admit of the quick and ready removal of the outer disk and to permit of a convenient and quick detachment of the demountable rim.

An object of the invention is to provide a wheel of this character which is strong, durable, inexpensive and easily cleaned and which will present at all times an attractive appearance while allowing of the inflation of the tire and the demounting and replacing of demountable rims.

With the foregoing and other objects in view, the invention will be more fully described hereinafter, and will be more particularly pointed out in the claims appended hereto.

Figure 1:
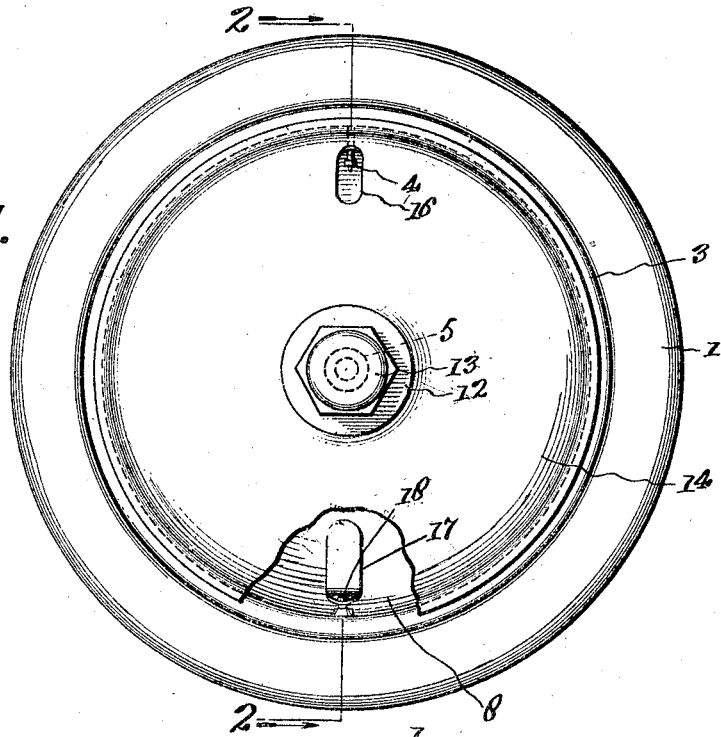
Figure 2:
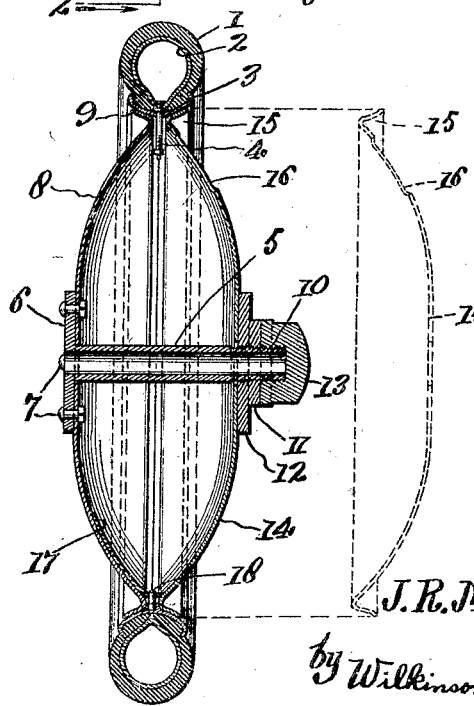

In the drawings, wherein like symbols refer to like or corresponding parts throughout the several views, Figure 1 is a side view with parts broken away showing an improved wheel construction in accordance with the present invention, and Figure 2 is a sectional view taken on the line 2—2 in Figure 1.

Referring more particularly to the drawings, 1 designates the outer shoe or casing of the usual form of pneumatic tire in which 2 is the inner tube and 3 the rim upon which the casing is carried and which rim is arranged to be removably mounted upon the improved disk wheel. The valve stem for inflating the inner tube is represented at 4.

In accordance with the invention a hub 5 is provided having a relatively heavy large flange 6 at its inner end to which is attached as by the bolts or rivets 7 the concavo-convex metallic disk 8 curving toward the demountable rim 3 and having the flange 9 at its rim conforming to one side wall of the demountable rim.

The other end of the hub 5 is exteriorly threaded as indicated at 10 to receive the nut 11 to which is attached a washer 12 having a large diameter. A lock nut 13 is also threaded upon the hub and takes against the nut 12, the nut 13 being ornamental and replacing the hub caps now used. The wide washer 12 bears against the outside face of a companion concavo-convex outer disk 14 which curves in an opposite direction to the inner disk and toward and within the perimeter of the demountable rim 3 having a flange 15 which fits against the opposite side of said demountable rim and within the base portion thereof. The two disks are held under suitable pressure by the tightening of the nut 11 and they will resiliently sustain the tire. A slot 16 is made in the outer disk 14 to give access to the valve stem 15 for testing and inflating the tire and a cover plate may be removably fitted over this slot to exclude foreign matter.

It will be noted the outer disk 14 is entirely free of any connection with the inner disk 8 and by simply unscrewing the nuts 11 and 13, the outer disk 14 may be removed as indicated at dotted lines in Figure 2. No connection is made at the outer edges of the disks and no connection is made between the flanges of the disks and the demountable rim. The inner disk 8 carries one or more lugs 17 having perforations to fit over pins 18 carried by the demountable rim. In this way a driving connection is set up between these two parts and the inner disk virtually constitutes the supporting and driving element of the wheel while the outer disk 14 is more in the nature of a cover which can be quickly removed, although it also serves the additional function of forcing the demountable rim against the flange of the inner disk and serving to suspend the rim. The quick removability of the outer disk allows of ease in the replacement of tires.

It will be noted that the construction is strong and possesses durability but is also simple and inexpensive.

It is obvious that various changes and modifications may be made in the details of construction and design of the above specifically described embodiment of this invention without departing from the spirit thereof, such changes and modifications being restricted only by the scope of the following claims.

I claim:

1. A wheel comprising a hub, an inner disk attached to the hub, a demountable rim engaged by said disk, driving means between the rim and disk, and an outer disk removably carried by said hub and having no connection with either the inner disk or the demountable rim but bearing against the latter.

2. A wheel comprising a hub, an inner disk secured to the hub and having a flanged outer end adapted to engage one side portion of a demountable rim, means arranged between said disk and the rim to drive the rim with the disk, an outer disk entirely free of the inner disk and the rim but having a flanged edge portion bearing against the outer part of the demountable rim, and means engaging the hub to removably support the outer disk in place.

3. A wheel comprising a flanged hub, a concavo-convex inner disk secured to the flanged hub and having a backwardly flaring outer marginal flange adapted to fit about the inner side and inner edge of a demountable rim for partially supporting the rim and further provided with a lug for interlocking with said rim, an outer similar disk having a flange also engaging the rim but not connected with the rim or with the inner disk, and nuts threaded upon the hub for removably securing and compressing the outer disk thereon.

JAMES R. MONTGOMERY.